(12) United States Patent
Dybdal et al.

(10) Patent No.: US 6,937,186 B1
(45) Date of Patent: Aug. 30, 2005

(54) MAIN BEAM ALIGNMENT VERIFICATION FOR TRACKING ANTENNAS

(75) Inventors: Robert B. Dybdal, Palos Verdes Estates, CA (US); Denny D. Pidhayny, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/875,025

(22) Filed: Jun. 22, 2004

(51) Int. Cl.$^7$ ............................................. G01S 7/40
(52) U.S. Cl. ..................... 342/173; 342/73; 342/74; 342/75; 342/80; 342/147; 342/149; 342/165; 342/174; 342/175; 342/195; 342/359; 342/360; 343/703
(58) Field of Search ................. 342/73–103, 147–158, 342/165–175, 195, 359, 360, 367–377, 352, 342/378; 343/703, 720; 455/67.11–67.7, 455/115.1–115.4, 226.1–226.4

(56) References Cited

U.S. PATENT DOCUMENTS

| | | | |
|---|---|---|---|
| 3,164,835 A * | 1/1965 | Alsberg ..................... 342/169 |
| 3,646,558 A * | 2/1972 | Campanella ................ 342/373 |
| 3,763,465 A * | 10/1973 | Tatge et al. ................. 342/378 |
| 3,997,901 A * | 12/1976 | Cayzac ....................... 342/367 |
| 4,083,048 A * | 4/1978 | DeRosa et al. ............... 342/95 |
| 4,170,011 A * | 10/1979 | Birkemeier et al. ........ 342/367 |
| 4,347,514 A * | 8/1982 | Birkemeier ................ 342/367 |
| 4,348,676 A * | 9/1982 | Tom ........................... 342/369 |
| 4,696,053 A * | 9/1987 | Mastriani et al. ........ 455/67.16 |
| 4,709,238 A | 11/1987 | Green |
| 4,823,134 A * | 4/1989 | James et al. ................. 342/359 |
| 4,888,592 A * | 12/1989 | Paik et al. ................... 342/359 |
| 4,963,890 A | 10/1990 | Perrotta et al. |
| 4,970,521 A * | 11/1990 | Lee ............................. 342/360 |
| 5,017,929 A | 5/1991 | Tsuda |
| 5,313,215 A * | 5/1994 | Walker et al. .............. 342/352 |
| 5,341,147 A * | 8/1994 | Scott .......................... 342/360 |
| 5,457,464 A * | 10/1995 | Scott et al. ................. 342/352 |
| 5,515,058 A * | 5/1996 | Chaney et al. .............. 342/359 |
| 5,797,083 A * | 8/1998 | Anderson ................... 342/359 |
| 5,912,642 A * | 6/1999 | Coffin et al. ................ 342/359 |
| 5,923,288 A * | 7/1999 | Pedlow, Jr. ................. 342/359 |
| 5,929,809 A * | 7/1999 | Erlick et al. ................ 342/372 |
| 5,940,028 A * | 8/1999 | Iwamura ..................... 342/359 |
| 5,964,822 A * | 10/1999 | Alland et al. ................. 342/90 |
| 6,087,985 A * | 7/2000 | Rummeli et al. ........... 342/359 |
| 6,087,995 A * | 7/2000 | Grace et al. ................ 343/703 |
| 6,320,541 B1 | 11/2001 | Pozgay et al. |
| 6,335,705 B1 * | 1/2002 | Grace et al. ................ 343/703 |
| 6,380,908 B1 * | 4/2002 | Andrews et al. ........... 342/375 |
| 6,417,803 B1 * | 7/2002 | de La Chapelle et al. .. 342/359 |
| 6,445,343 B1 * | 9/2002 | Pietrusiak .................. 342/368 |
| 6,556,166 B1 * | 4/2003 | Searcy et al. ............... 342/165 |
| 6,580,391 B1 * | 6/2003 | Kepley et al. .............. 342/359 |
| 6,608,590 B1 * | 8/2003 | Naym et al. ................ 342/359 |

(Continued)

Primary Examiner—Bernarr E. Gregory
(74) Attorney, Agent, or Firm—Henricks, Slavin & Holmes LLP

(57) ABSTRACT

A method for main beam alignment verification includes providing data pertaining to one or more patterns associated with an antenna, measuring power levels of a signal acquired by the antenna, and comparing the measured power levels with the data to determine whether a direction of the signal is incident upon a main beam of the antenna.

21 Claims, 5 Drawing Sheets

U.S. PATENT DOCUMENTS

| | | | |
|---|---|---|---|
| 6,611,236 B1 * | 8/2003 | Nilsson | 342/81 |
| 6,611,696 B2 * | 8/2003 | Chedester et al. | 342/359 |
| 6,646,598 B1 * | 11/2003 | Timothy et al. | 342/359 |
| 6,661,373 B1 * | 12/2003 | Holliday | 342/359 |
| 6,690,917 B2 * | 2/2004 | Soliman et al. | 342/352 |
| 6,714,156 B1 * | 3/2004 | Ibrahim et al. | 342/174 |
| 2003/0210176 A1 | 11/2003 | Hager et al. | |
| 2004/0046695 A1 | 3/2004 | Brothers, Jr. et al. | |

* cited by examiner

MAIN BEAM ALIGNMENT VERIFICATION FOR TRACKING ANTENNAS

TECHNICAL FIELD

The invention relates generally to antenna tracking and, in particular, to main beam alignment verification for angle tracking antennas.

BACKGROUND ART

Tracking antenna systems dynamically follow changes in a direction of a received signal, and position a tracking antenna to align the signal with the peak level of the main beam of the tracking antenna. Such signal alignment results in coincidence of the signal and a portion of the main beam that provides maximum antenna gain and thus system sensitivity.

Various approaches to antenna tracking involve aligning the main beam peak of an antenna with the signal by using open commanding and relative power measurements. One example, referred to as "step track," involves positioning an antenna in a nominal direction, and commanding the antenna in equal but opposite angular offsets and measuring received signal power at each offset position. If the received signal power levels are equal, the antenna is correctly aligned. If the received power levels are unequal, the difference in the power levels can be used to correct the antenna alignment. The process is repeated in the orthogonal plane. The step track technique is periodically repeated to validate correct antenna alignment and to follow any changes in the direction of the signal.

Other approaches to antenna tracking involve a closed loop technique referred to as "monopulse." Two types of antenna patterns are used in such techniques. The first type of pattern has a maximum gain value that is coincident with the axis of the antenna, and is used for data reception. The second type of pattern has a null on the axis of the antenna and, to first order, has a linear variation with displacements from the axis and typically a phase difference between the data pattern and the tracking pattern that coincides with the azimuth angle of the signal direction. This behavior, the linear increase with deviation from axis and the phase difference, is used by an antenna control unit as an error signal, thereby permitting implementation of a closed loop tracking system that dynamically follows changes in the direction of the signal.

Unfortunately, these angle-tracking techniques depend upon initial antenna pointing (prior to initiation of antenna tracking) to align the signal within the main beam angular extent of the antenna. In some cases, however, such alignment is not assured.

One prior method for verifying this alignment involves using a smaller guard antenna together with the larger main antenna that is used for data reception. In practice, the smaller antenna is about ¹⁄₁₀ the diameter of the main antenna to obtain the required gain and pattern characteristics to envelope the sidelobes of the main antenna. The signal levels received by the main antenna and the guard antenna are then compared. If the signal level of the main antenna exceeds the signal level of the guard antenna, the antenna is aligned within the main beam where the main antenna gain is higher than the gain of the guard antenna. If the signal level of the main antenna is comparable or less than the signal level of the guard antenna, then the signal is aligned with sidelobes of the main antenna.

In addition to requiring a second antenna, another shortfall of this technique is that the boresight of the guard antenna needs to be maintained coincident with the main antenna. Moreover, the smaller guard antenna needs to be mechanically isolated from the main antenna to avoid deforming the main antenna and its patterns, and the mechanical balance of the assembly needs to be maintained. When the received signal level fluctuates, as commonly occurs with multipath at low elevation angles, the guard antenna requires a second tracking receiver so that the signal levels in the guard and main antennas can be simultaneously measured. Aside from the expense of an additional tracking receiver, the two receivers need to be reliably calibrated so that the same received power level results in the same indicated signal levels. This calibration is needed so that the signal level comparison can be used to reliably verify main beam alignment. Additionally, for large antennas that require a protective radome to avoid pointing errors caused by wind loading, a larger radome that envelops both the main and guard antennas is significantly more expensive than a radome for the main antenna alone.

Thus, it would be useful to be able to provide a main beam alignment verification alternative to the prior approaches. It would also be desirable to be able to provide a cost effective method for verifying the main beam alignment of received signals. It would also be useful to be able to provide a mechanism for verifying main beam alignment without imposing additional hardware capabilities, i.e., using existing antenna hardware.

DISCLOSURE OF INVENTION

Figure 1:
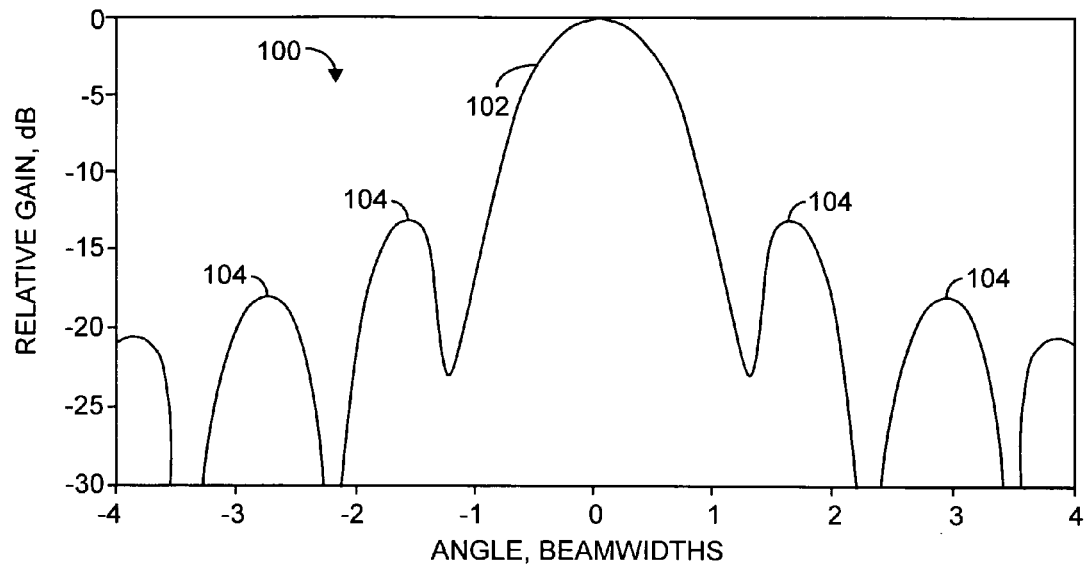
FIG. 1 is a plot showing a typical antenna pattern for a data channel.

Various methods for verifying main beam alignment according to the present invention generally involve measuring the width of the lobe containing the received signal. As shown in FIG. 1, in a typical antenna pattern 100 for a data channel, the angular width of the main beam 102 of the antenna is roughly twice the angular width of the sidelobes 104 of the antenna. In an example embodiment, open loop commanding is used to measure the width of the lobe containing the received signal and provides a mechanism for verifying main beam alignment. By way of example, such an embodiment can be used with antenna tracking methods that utilize open loop techniques.

As discussed below, various embodiments can be implemented with existing antenna hardware operated in conjunction with appropriate software controls and received power measurements. Furthermore, the methods described herein do not require a guard antenna and, therefore, do not require the additional aperture needed for the guard antenna or an additional tracking receiver to measure the signal levels received by the guard antenna.

Figure 4:
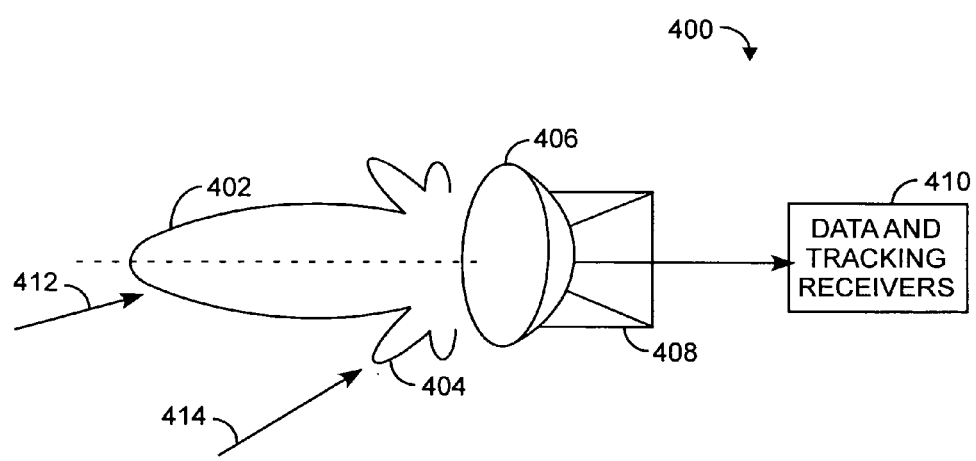
FIG. 4 illustrates an example of an antenna tracking system and signals arriving at different angles relative to a main beam and a side lobe, which are shown in cross-section.

FIG. 4 illustrates an example of an antenna tracking system 400 and signals arriving at different angles relative to a main beam 402 and a sidelobe 404. The antenna tracking system 400 include an antenna 406 (e.g., a reflector antenna), an antenna positioner 408 and data and tracking receivers 410 as shown. In this example, an arrow 412 indicates a signal arrival direction incident upon the main lobe 402 as shown. An arrow 414 indicates a signal arrival direction incident upon the sidelobe 404 as shown.

Figure 5:
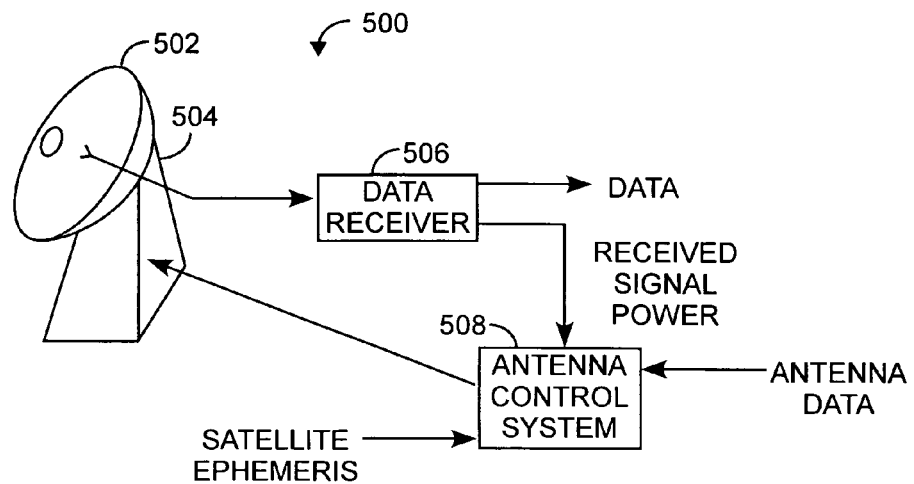
FIG. 5 illustrates an example open loop antenna tracking system.

Referring to FIG. 5, an example open loop antenna tracking system 500 exploits the circumstance that the angular width of the main beam is roughly twice that of the sidelobes. In this embodiment, the difference in the angular widths of the main beam and the sidelobes is used to verify main beam alignment.

The example open loop antenna tracking system 500 includes an antenna 502, a positioner 504, a data receiver 506 and an antenna control system 508, configured as shown. The antenna control system 508 is provided with a received signal power input from the data receiver 506. In this example embodiment, satellite ephemeris and antenna data inputs are also provided to the antenna control system 508.

In operation, after the data receiver 506 acquires the signal, a signal level measurement is made. A typical received signal level indication is the automatic gain control (AGC) voltage of the receiver. The antenna 502 is then offset in equal angular increments in opposite directions and the received power levels at each offset position are measured using a step track procedure, for example. In this example embodiment, the measured power levels are used for an additional purpose. The three measured power levels, at the initial acquisition point and the two angularly displaced positions, are then compared to the a priori known main beam shape and the sidelobe shape of the antenna 502. The a priori antenna data and the measured power levels are processed by the antenna control system 508 which includes, for example, a main beam search algorithm in firmware and step track decision logic for sidelobe determination. Because the angular width of the sidelobes is less than that of the main beam, the power level changes at the angular offset positions are more drastic than those at the main beam. By this comparison of the three power levels with the a priori antenna pattern data, decisions are made as to main beam alignment or sidelobe alignment. In this example embodiment, the process is then repeated in an orthogonal direction.

Figure 7:
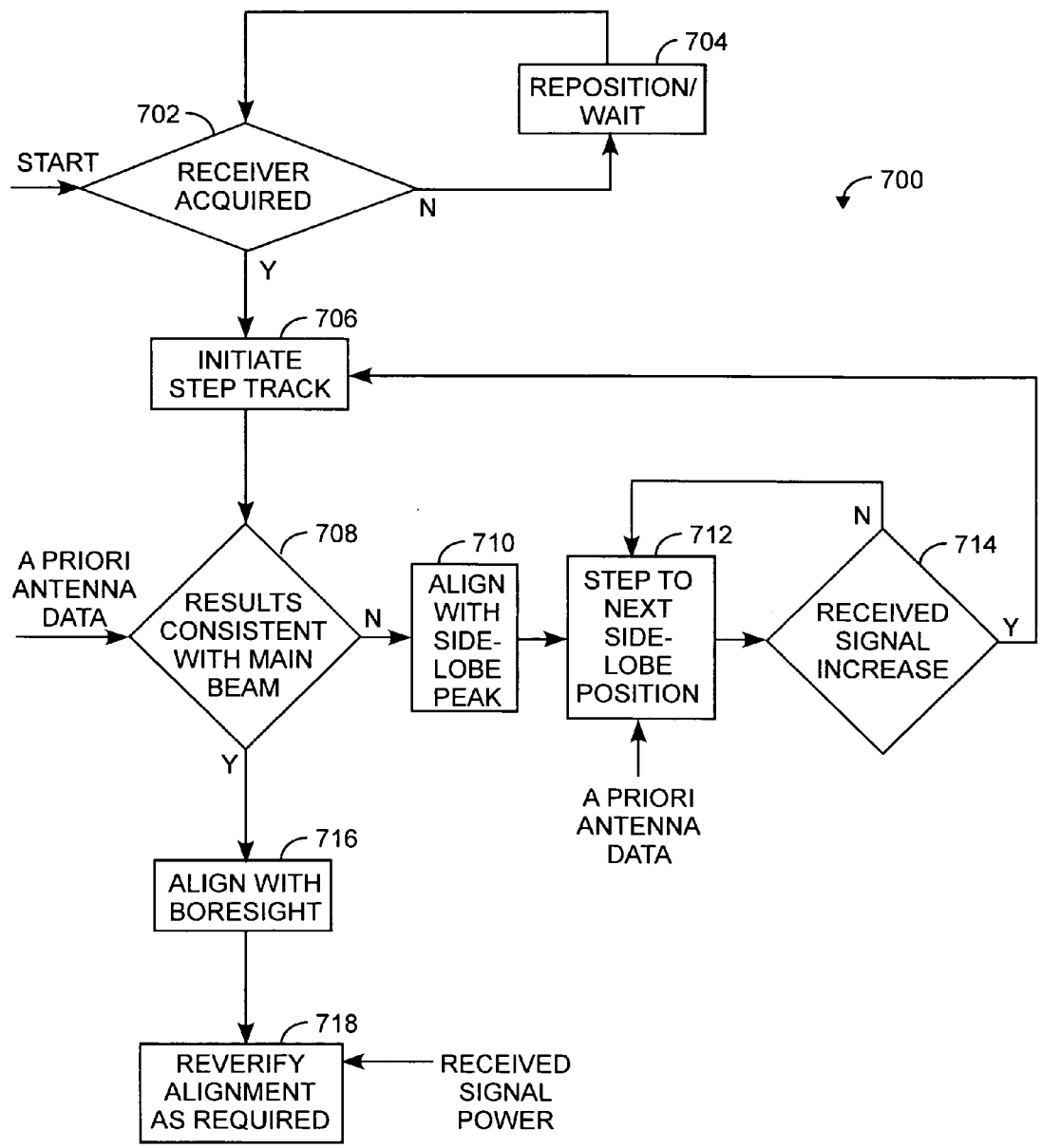
FIG. 7 is a flowchart of an example method for open loop antenna tracking.

FIG. 7 shows an example open loop antenna tracking method 700. At step 702, a determination is made as to whether the receiver has acquired a signal. If the determination is negative, at step 704, the antenna is repositioned and acquisition reattempted until successful. At step 706, step track is initiated to make the power measurements as discussed above. At step 708, the measured power levels are compared to the a priori antenna data and a determination is made as to whether a received signal appears to be incident upon the main beam. If this determination is negative, then at step 710 the antenna is aligned with the sidelobe peak. Once aligned with the sidelobe peak, at step 712 the antenna is stepped to the next sidelobe peak using an open loop command. In this example embodiment, the a priori antenna pattern is used for this process, and typically the antenna step size is about one and one-half beamwidths between sidelobe peak positions. At step 714, a determination is made as to whether the received signal increases in strength and step 712 is repeated until this determination is affirmative. If the open loop repositioning command encounters the main beam of the antenna, the antenna will not be aligned with the main beam peak but will be sufficiently high on the main beam to provide a clear indication of main beam alignment. At step 716, the received signal is aligned with boresight. At step 718, this alignment is re-verified using, for example, either a step track or a monopulse monitoring technique.

In an example embodiment, open loop commanding techniques are used to find the main beam. By using an open loop command to the next sidelobe peak and/or the main antenna beam, there may be sufficient received signal power to maintain receiver acquisition, and therefore it will not be necessary to move the antenna and try to reacquire the receiver. If the tracking receiver has not acquired, a two-dimensional raster scan (e.g., in azimuth and elevation) can be used. In such a case, once the tracking receiver has acquired, the open loop commanding for antenna repositioning can be used.

Other information can be used in the above search process. For example, in some cases, an estimate of the nominal signal level may be available. Also by way of example, when an acquisition at low elevation angles is being performed, the search for the main beam can exclude those antenna positions where the main beam would be positioned below the horizon.

Signal level fluctuations can have an impact on open loop antenna tracking techniques. Multipath is a common cause of such fluctuations that occurs at low elevation angles. For step track, the fluctuations can be reduced by dwelling at each angular position for a sufficient amount of time to average the power measurements. Averaging at low elevation angles may have limited effectiveness in cases where the multipath has a strong specular component. Averaging, particularly in the elevation coordinate, is less effective since the average of the direct signal and the multipath component has a non-zero mean value. It is generally more effective to average in the azimuth coordinate. An alternative approach is to wait until the satellite has increased in its elevation angle and the spatial filtering of the pattern of the receive antenna reduces multipath. When the satellite is higher above the horizon, a further search for the main beam can be conducted at the anticipated position of the satellite at that time. The main beam acquisition verification method described above can be used for open loop tracking designs using step track techniques or with closed loop monopulse-based tracking designs.

In an example embodiment, a method for main beam alignment verification includes providing data including main beam and sidelobe angular widths for an antenna, measuring power levels of a signal acquired by the antenna at multiple antenna positions, and comparing the measured power levels with the data to determine whether a direction of the signal is incident upon a main beam of the antenna.

In another example embodiment, a method for main beam alignment verification includes providing data pertaining to one or more patterns associated with an antenna, measuring power levels of a signal acquired by the antenna, and comparing the measured power levels with the data to determine whether a direction of the signal is incident upon a main beam of the antenna.

Figure 6:
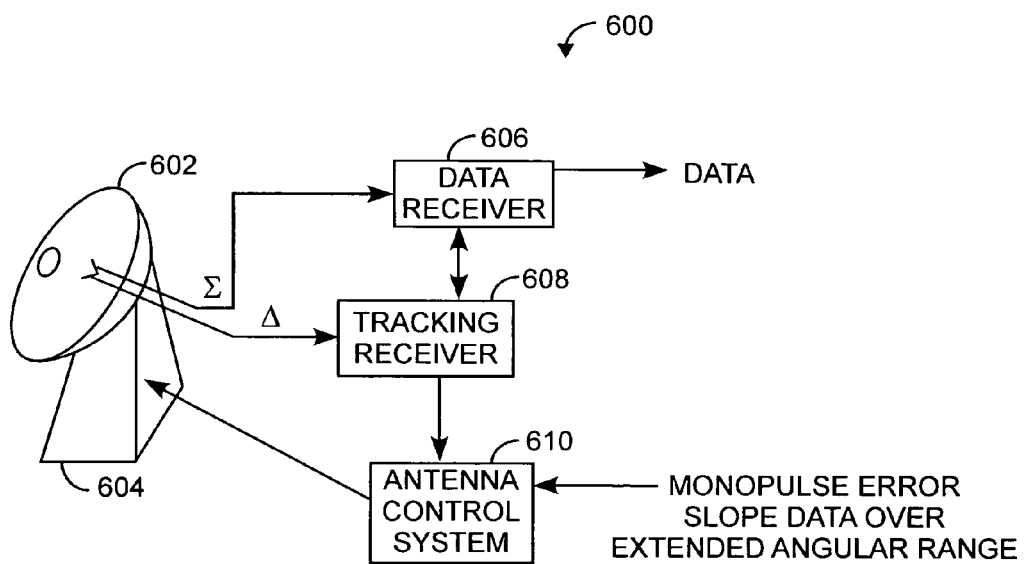
FIG. 6 illustrates an example closed loop antenna tracking system.

Various methods for verifying main beam alignment according to the present invention involve examining monopulse error response. Referring to FIG. 6, an example closed loop antenna tracking system 600 exploits a monopulse-based design and includes an antenna 602, a positioner 604, a data receiver 606, a tracking receiver 608 and an antenna control system 610, configured as shown. In an example embodiment, a monopulse error response is examined and serves as a basis to decide whether the antenna is aligned within the main beam. By way of example, such an embodiment can be used to verify main beam alignment prior to initiating a closed loop tracking operation. Also by way of example, such an embodiment can be used with antenna tracking methods that utilize monopulse-tracking techniques.

Figure 2:
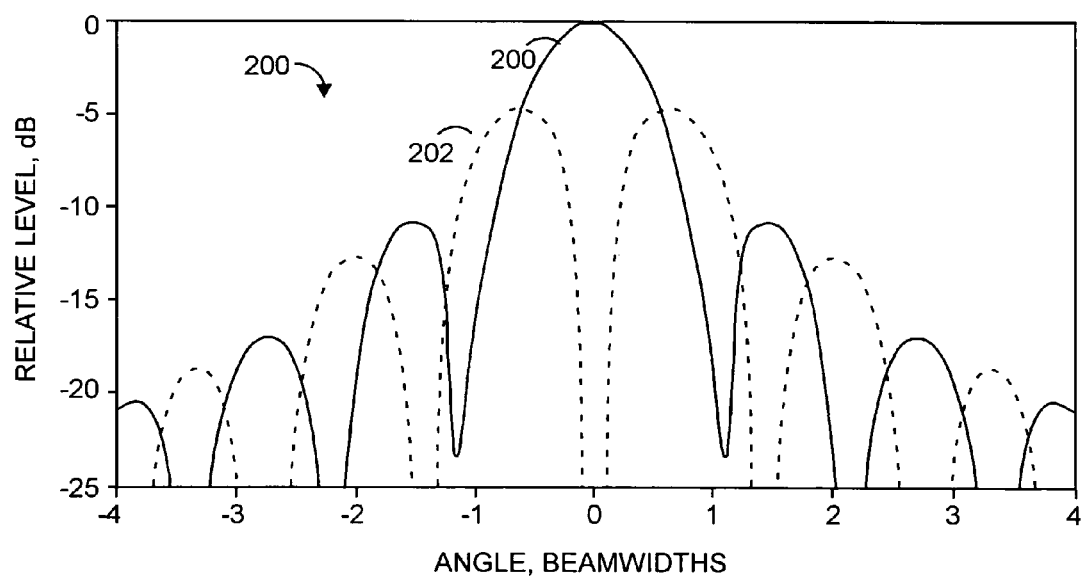
FIG. 2 is a plot showing examples of data (sum) and tracking (difference) patterns.
Figure 3:
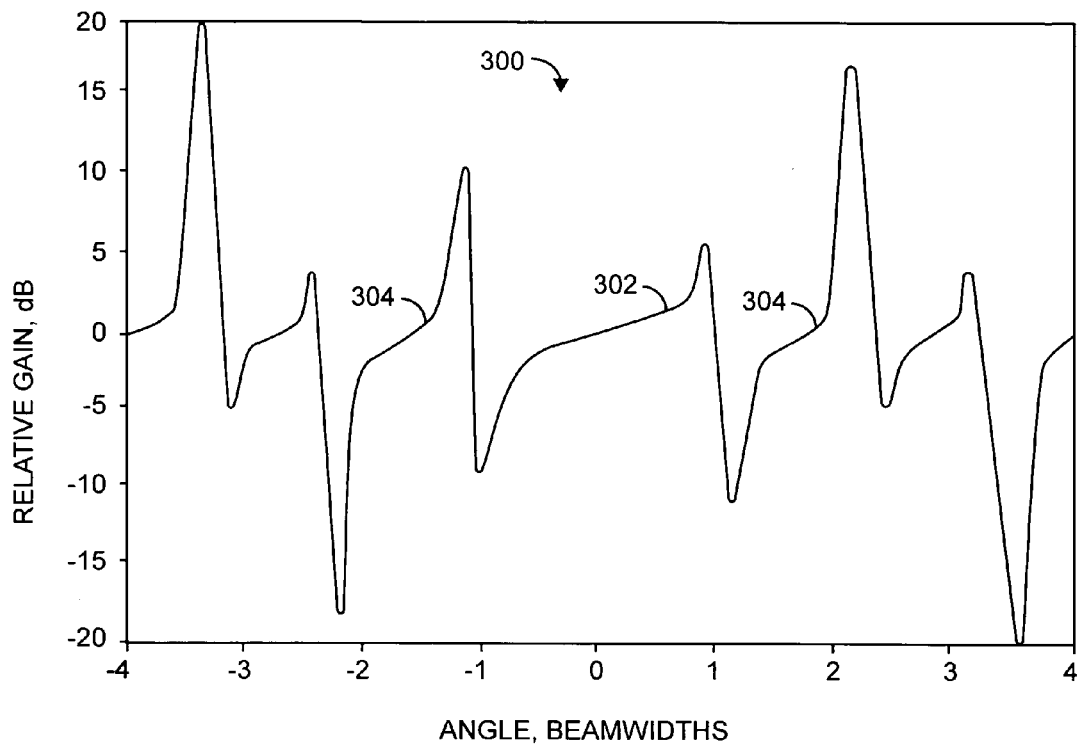
FIG. 3 is a plot of an example monopulse error response.

FIG. 2 is a plot showing examples of a data (sum) pattern 200 and a tracking (difference) pattern 202 (in dashed lines) for a typical antenna. In this example, the main beam peak of the data pattern 200 is coincident with the null of the tracking pattern 202. Referring to FIG. 3, over the same angular region, a monopulse error response 300 results from dividing the tracking pattern 202 by the data pattern 200. The actual values depend on the difference in the path loss between the data and tracking channel and the coupler coefficient.

In an example embodiment, a determination is made as to whether a measured monopulse output is consistent with the main beam. By way of example, the monopulse error response is determined a priori by measurements and/or analyses of the tracking system for the antenna. In an example embodiment, the monopulse error response is determined over the linear error response of the main lobe (which for practical antenna designs is typically somewhat less than the width of the main beam as shown in FIG. 3) and also out into the sidelobe regions; this extended response provides a data base that is used to verify main beam alignment. A common implementation couples a small portion of the tracking signal onto the data signal. The tracking signal is switched to quadrature positions and when added to the data signal, produces an amplitude modulation indicating antenna misalignment that is acted on by the antenna control system.

Figure 8:
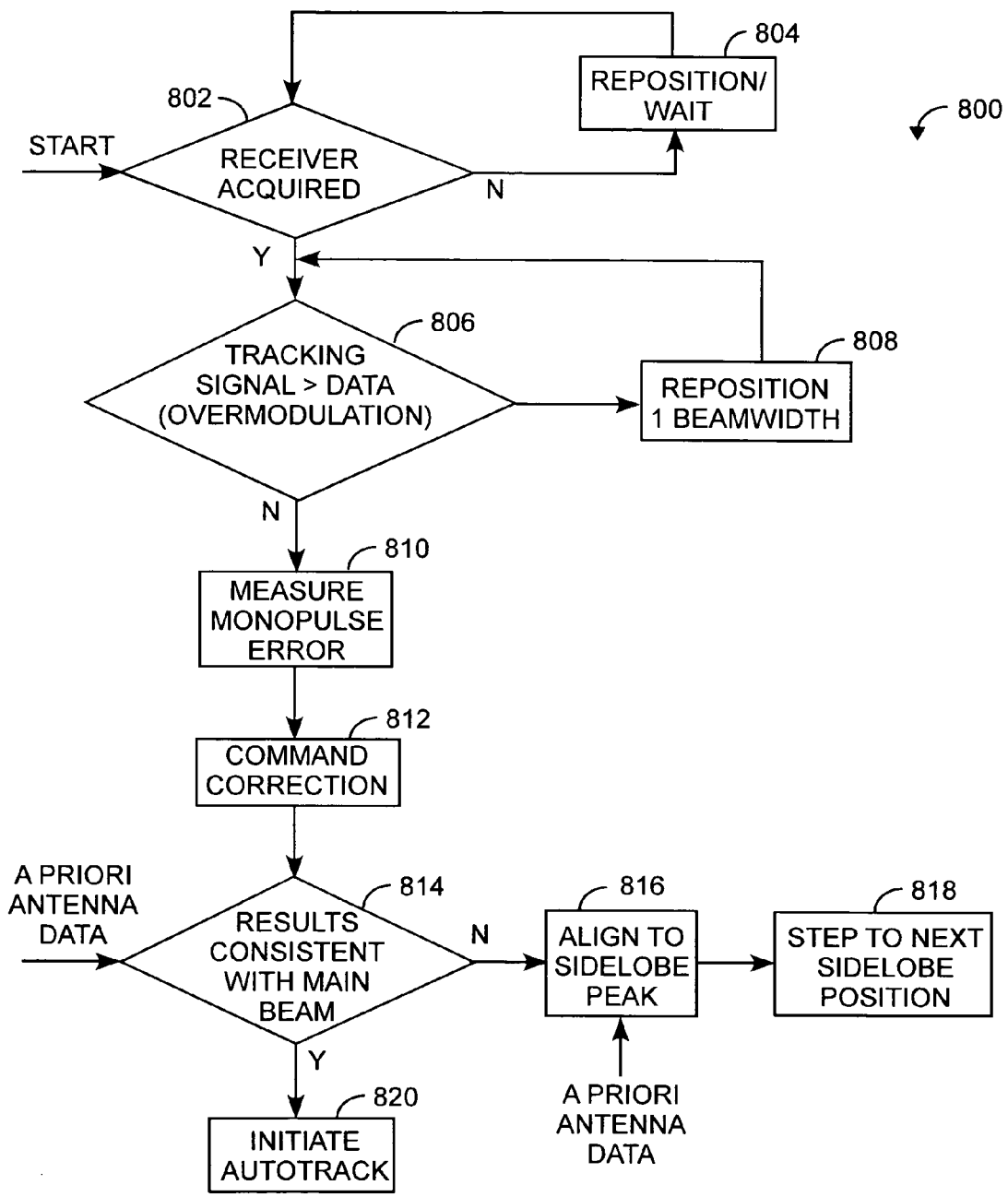
FIG. 8 is a flowchart of an example method for closed loop antenna tracking.

In an example main beam alignment method, a determination is made as to whether indicated tracking error behavior corresponds to variations that result in the main beam of the antenna. FIG. 8 shows an example closed loop antenna tracking method 800. At step 802, a determination is made as to whether the receiver has acquired a signal. If the determination is negative, at step 804, the antenna is repositioned and acquisition reattempted until successful. As shown in FIG. 2, the data and tracking antenna patterns indicate regions within the sidelobe response of the antenna where the tracking pattern 202 can exceed the data pattern 200 and overmodulation occurs. At step 806, a determination is made as to whether modulation values are within a range resulting from antenna positions within the main beam. If an overmodulation is present, at step 808 the antenna is repositioned (e.g., one beamwidth) until a modulation condition is detected. If the modulation level lies within a range that is credible for the antenna, the antenna can be open loop commanded to a position that corresponds to the boresight location for the main beam. In this example embodiment, at step 810 the monopulse error is measured, and at step 812 the position correction is commanded. At step 814, if the open loop repositioning results in the expected reduction of the modulation from the tracking channel consistent with the a priori antenna data for the main beam of the antenna, then the system does indeed have alignment within the main beam. As shown in FIG. 3, the error slope within the main beam region 302 is less than the error slope when a linear region exists within the sidelobe regions 304 of the antenna. If the determination at step 814 is negative, a sidelobe of the antenna is aligned with the signal. Then, at step 816 the a priori antenna data is used to align the antenna to the sidelobe peak, and the antenna is stepped to the next sidelobe position until the results of the determination made in step 814 are consistent with main beam positioning. Then, at step 820 closed loop operation (e.g., autotrack) is initiated.

As discussed above, open loop pointing techniques can be used to realign the antenna with the main beam. The monopulse error response can also be used to realign the antenna to its main beam of the data pattern. As with the open loop tracking technique, measurement and/or analyses can be used to determine the monopulse error response and knowledge of this response can be used in open loop commanding to determine the realignment. Linear regions of the monopulse error response also coincide with the sidelobe peaks, and open loop commanding can be used to reposition the antenna to realign the antenna. Open loop commanding can be used in conjunction with determining whether an error slope corresponds to a value within the main beam or within the sidelobes. If the system has a closed loop monopulse-based tracking system, a combination of the approaches described herein can be used to obtain a further assurance of main beam acquisition.

In an example embodiment, a method for main beam alignment verification includes providing data including monopulse error responses for a main beam region and sidelobe regions of an antenna, measuring power levels of a signal acquired by the antenna at multiple antenna positions, and comparing the measured power levels with the data to determine whether a direction of the signal is incident upon a main beam of the antenna.

Although the present invention has been described in terms of the example embodiments above, numerous modifications and/or additions to the above-described embodiments would be readily apparent to one skilled in the art. It is intended that the scope of the present invention extend to all such modifications and/or additions.

We claim:

1. A method for main beam alignment verification, comprising:
   providing data pertaining to one or more patterns associated with an antenna;
   measuring power levels of a signal acquired by the antenna; and
   comparing the measured power levels with the data to determine whether a direction of the signal is incident upon a main beam of the antenna.

2. The method for main beam alignment verification of claim 1, wherein the one or more patterns include a data pattern.

3. The method for main beam alignment verification of claim 1, wherein the one or more patterns include data and tracking patterns.

4. The method for main beam alignment verification of claim 1, wherein the data includes main beam and sidelobe angular widths for the antenna.

5. The method for main beam alignment verification of claim 1, wherein the data includes monopulse error responses for a main beam region and sidelobe regions of the antenna.

6. The method for main beam alignment verification of claim 1, wherein the data is a priori.

7. The method for main beam alignment verification of claim 1, wherein multiple samples of the measured power levels at a common antenna position are averaged.

8. The method for main beam alignment verification of claim 1, wherein power levels measured in the azimuth coordinate are averaged.

9. A method for main beam alignment verification, comprising:
   providing data including main beam and sidelobe angular widths for an antenna;
   measuring power levels of a signal acquired by the antenna at multiple antenna positions; and
   comparing the measured power levels with the data to determine whether a direction of the signal is incident upon a main beam of the antenna.

10. The method for main beam alignment verification of claim 9, wherein the data is a priori.

11. The method for main beam alignment verification of claim 9, wherein multiple samples of the measured power levels at a common antenna position are averaged.

12. The method for main beam alignment verification of claim 9, wherein power levels measured in the azimuth coordinate are averaged.

13. The method for main beam alignment verification of claim 9, further including using the data to reposition the antenna.

14. The method for main beam alignment verification of claim 9, further including using the data to reposition the antenna after a determination has been made that the signal is not incident upon the main beam.

15. The method for main beam alignment verification of claim 9, further including using the data to reposition the antenna to align the signal with a sidelobe of the antenna.

16. A method for main beam alignment verification, comprising:
   providing data including monopulse error responses for a main beam region and sidelobe regions of an antenna;
   measuring power levels of a signal acquired by the antenna at multiple antenna positions; and
   comparing the measured power levels with the data to determine whether a direction of the signal is incident upon a main beam of the antenna.

17. The method for main beam alignment verification of claim 16, wherein the monopulse error responses are determined from data and tracking patterns of the antenna.

18. The method for main beam alignment verification of claim 16, wherein the data is a priori.

19. The method for main beam alignment verification of claim 16, further including using the data to reposition the antenna.

20. The method for main beam alignment verification of claim 16, further including using the data to reposition the antenna after a determination has been made that the signal is not incident upon the main beam.

21. The method for main beam alignment verification of claim 16, further including using the data to reposition the antenna to align the signal with a sidelobe of the antenna.

* * * * *